United States Patent
Rhyne

(10) Patent No.: US 7,073,319 B1
(45) Date of Patent: Jul. 11, 2006

(54) NUCLEAR-FUELED POWER GENERATING SYSTEM

(76) Inventor: Stephen K. Rhyne, 620 Hempstead Pl., Charlotte, NC (US) 28207

( * ) Notice: Subject to any disclaimer, the term of this patent is extended or adjusted under 35 U.S.C. 154(b) by 0 days.

(21) Appl. No.: 11/065,257

(22) Filed: Feb. 24, 2005

Related U.S. Application Data

(62) Division of application No. 10/244,187, filed on Sep. 16, 2002, now Pat. No. 6,877,309.

(60) Provisional application No. 60/323,506, filed on Sep. 19, 2001.

(51) Int. Cl.
F02C 3/14 (2006.01)
F02K 11/00 (2006.01)
G21D 5/02 (2006.01)

(52) U.S. Cl. .................... 60/39.35; 60/203.1

(58) Field of Classification Search ............ 60/203.1, 60/39.35
See application file for complete search history.

(56) References Cited

U.S. PATENT DOCUMENTS

| | | | |
|---|---|---|---|
| 2,709,895 A | 6/1955 | Mount ...................... | 60/49 |
| 3,102,852 A | 9/1963 | Schenck, Jr. ............. | 204/193.2 |
| 3,258,911 A | 7/1966 | Bouquet, Jr. et al. ...... | 60/35.6 |
| 3,371,609 A | 3/1968 | Radebold et al. ........... | 103/1 |
| 4,208,590 A | 6/1980 | Blomquist et al. ......... | 290/1 R |
| 4,282,443 A | 8/1981 | Seidl ..................... | 290/1 R |
| 4,377,266 A | 3/1983 | Belew et al. ............. | 244/159 |
| 4,577,460 A | 3/1986 | Wirsching ................ | 60/39.35 |
| 4,694,187 A | 9/1987 | Baker ..................... | 290/4 R |
| 4,891,600 A | 1/1990 | Cox ....................... | 328/233 |
| 5,255,509 A | 10/1993 | Powell et al. ............ | 60/203.1 |
| 5,300,817 A | 4/1994 | Baird ..................... | 290/55 |
| 5,636,512 A | 6/1997 | Culver .................... | 60/203.1 |
| 5,660,038 A | 8/1997 | Stone ..................... | 60/39.35 |
| 6,877,309 B1 * | 4/2005 | Rhyne ..................... | 60/203.1 |

* cited by examiner

Primary Examiner—Ted Kim
(74) Attorney, Agent, or Firm—Kennedy Covington Lobdell & Hickman, LLP

(57) ABSTRACT

An apparatus for generating electricity that uses at least one jet-type engine fueled with fissile material. The nuclear fueled jet engine is affixed to a connecting member that projects from a central, rotatable shaft, which is in engageable communication with an apparatus for converting the rotation of the central shaft to electricity, such as a stator and rotor combination. The engine is positioned so that the thrust produced by the jet engine causes the engine and connecting member to travel in a radial direction around the longitudinal axis of the central shaft, rotating the central shaft. As the central shaft rotates, the rotational motion of the central shaft is transmitted to conversion apparatus. An operating gas is used to cool the nuclear fueled jet engines and as the propellant for the jet engines.

17 Claims, 9 Drawing Sheets

NUCLEAR-FUELED POWER GENERATING SYSTEM

This application is a divisional of prior application Ser. No. 10/244,187, filed on Sep. 16, 2002, now granted as U.S. Pat. No. 6,877,309, which claims the benefit of U.S. provisional application No. 60/323,506, filed Sep. 19, 2001, each of which is incorporated herein by reference in its entirety.

FIELD OF THE INVENTION

This invention relates to the production of electricity through the use of nuclear energy, in particular nuclear fueled jets.

BACKGROUND OF THE INVENTION

For almost fifty years, electricity has been generated by large-scale power plants utilizing nuclear reactors as the energy source to heat the coolant in the reactor that, directly or indirectly, drives a turbine that generates electricity. Fuel assemblies containing fissile material are placed within the reactor core in precise patterns. The coolant is pumped through the reactor core, where the heat generated by the individual fuel assemblies is transferred to the coolant. In one common commercial power generation system—known as a pressurized water reactor system—the heated coolant is directed through at least one heat transfer apparatus (e.g., a heat exchanger) in which the thermal energy of the heated coolant is transferred to a secondary coolant which is then used to drive the turbine while the reactor coolant, now cooled, is pumped back to the reactor core in a closed loop coolant system. In another common commercial power generation system—known as the boiling water reactor system—the heated coolant is used to drive the turbine without the secondary transfer of thermal energy. Both power generation systems include thermal energy losses which reduces the overall electrical generation efficiency.

While no serious threats to public health or the environment have occurred in the United States due to the operation of nuclear reactors in electrical power generation systems, the public perception of nuclear reactors includes numerous safety concerns. Although many of these concerns are exaggerated, they have resulted in multiple barriers to the continued operation of existing nuclear reactors as well as the design, placement and construction of newer reactors. Additionally, the safety concerns requires any operational nuclear reactor to adhere to a myriad of precautions and restrictions that are not found in other power generation systems such as coal which increases the cost of operating nuclear power generation stations. Due to the size of the conventional commercial nuclear power generation stations as well as the design and inherent operational characteristics of the nuclear reactor, nuclear power generation stations must, to the extent possible, be operated continuously. Also, locations suitable for such large power generation facilities are extremely limited. This is especially the case in densely populated areas with large electricity demands or in sparsely populated areas with electricity demands that are relatively small compared to the electricity supplied by a conventional commercial nuclear power generating station. Finally, many existing nuclear reactors are reaching the end of their originally licensed operational periods.

Another power generation system that converts mechanical, rotational motion to electrical energy uses jets to create the rotational motion. For example, Blomquist, U.S. Pat. No. 4,208,590, discloses an electrical generating apparatus that uses at least two conventional internal combustion jet engines mounted on the ends of diametrically opposed rotatable blades that are attached to a central shaft. A circular-shaped rotor is affixed to the blades at a location between the central shaft and the jets. A stationary stator is attached to a base such that the rotor is in communication with the stator. When operating, the jets rotate the blades, causing the rotor to rotate relative to the stator, thereby generating electricity. The blades rest on wheels that are attached to the blades and travel within a track affixed to the base. The blades have ailerons for controlling the elevation of the blades as they are rotated by the jet engines. The system relies on the elevation of the blades being controlled by the ailerons for reducing the friction between the wheels and the track and between the hub to which the blades are attached and the central shaft upon which it rests.

Internal combustion jet engines require a constant supply of extremely flammable jet fuel. Additionally, the exhaust from conventional jet engines contain many substances that are harmful to the environment and contribute to air pollution. Further, conventional jet engines are relatively inefficient in converting jet fuel to thrust energy. Therefore, the use of such a power generating system for any period of time increases the demand on hydrocarbon fuels and results in an increase in air pollution. Additionally, the power generating system has substantial energy losses due to the significant friction between the wheels and the track and between the hub and the shaft as well as the drag created by the ailerons moving through the air during operation.

A similar power generation system is disclosed in Mount, U.S. Pat. No. 2,709,895. Mount uses ram jets or rocket motors that are attached to a rotatable plate that is connected to one end of a rotatable shaft. An electrical generator is attached to the opposite end of the shaft. Thrust created by the ram jets or the rocket motors causes the plate to rotate, which causes the shaft and generator to spin. Blomquist includes a secondary power generation system which uses the heat from the jet or rocket exhaust to heat water that surrounds a fire chamber into which the exhaust is directed. The heated water is used to create steam which drives a turbine.

It is believed that the use of ram jets or rocket motors provides a more efficient fuel-to-thrust ratio than conventional internal combustion jet engines. However, it appears that additional external energy is required to create an initial rotational speed sufficient to allow the ram jets to operate. Further, a fan is required to provide sufficient air to the ram jets during operation. Liquid fueled rocket motors may be used instead of the ram jets, which reduces the size of the propulsion unit necessary to generate the same amount of thrust. However, using volatile liquid fuel introduces an additional danger. While the exhaust heat is used as a source for a secondary generator, the added equipment required to pump the water through the coolant jacket surrounding the fire chamber, into an associated coolant ring and through the turbine increases the losses experienced by the overall power generation system.

Therefore, it is desired to design an electrical power generating system that takes advantage of the large energy-to-mass ratio and the long useful life of fissile material, which are singular characteristics of fissile material, and couple them with the relative energy conversion efficiency of an apparatus that converts rotational motion to electrical energy while eliminating or at least lessening the disadvantages associated with the current commercial nuclear power generating stations.

SUMMARY OF THE INVENTION

Briefly summarized, the present invention is an apparatus for generating electricity that uses at least one jet engine fueled with fissile material. The nuclear fueled jet engine is affixed to an arm that projects from a central, rotatable shaft. The shaft is also attached to a device that converts rotational motion to electricity. The jet engine is positioned so that the thrust produced by the jet engine causes the engine and arm to travel in a radial direction around the longitudinal axis of the central shaft, rotating the central shaft. As the central shaft rotates, the rotational motion is converted to electricity.

In a preferred embodiment, at least two jet engines are each affixed to an arm that is attached at diametrically opposed positions to the central shaft. In this configuration, the two diametrically opposed arms are considered a crossbeam. The thrust from the two jet engines rotate the central shaft and, ultimately, the device that converts the central shaft rotation to electricity.

In a preferred embodiment, the device used to convert rotational energy to electricity is a generator having a rotor in communication with a stator.

In another preferred embodiment, the device for converting rotational energy to electricity may be connected to the cross beam intermediate the jet engine and the rotatable central shaft. In another preferred embodiment, the central shaft has a stationary continuous inner trunk and a partial, rotatable, outer surface upon which the crossbeam is connected.

A feature of the present invention is the use of fissile material to fuel the jet engines. Fissile material is material that undergoes the fission—splitting apart—process and in doing so creates at least two lighter elements and a known amount of energy. Such fissile materials include uranium, plutonium, thorium, and combinations thereof, called mixed-oxides (MOX).

Another feature of the present invention is the use of a gas, for example hydrogen, helium or nitrogen, as both the propellant for the jet engine and the coolant for the fissile material located within the jet engines. One possible safety feature of the gas may be the ability to add a neutron poison to the gas in order to effectuate a rapid and complete shutdown of the jet engines.

A preferred embodiment includes an enclosure surrounding the jet engines, the crossbeams, and at least a portion of the central shaft. This enclosure contains the gas used as the propellant and coolant as well as the fissile material within the jet engines.

Another embodiment of the present invention may include locating the device for converting rotational motion to electricity along an inner surface of an enclosure in a position such that the exhaust of the jet engines engages the device.

BRIEF DESCRIPTION OF THE DRAWING

Further features, embodiments and advantages of the present invention will become apparent from the following detailed description with reference to the drawings wherein.

DETAILED DESCRIPTION

Figure 1:
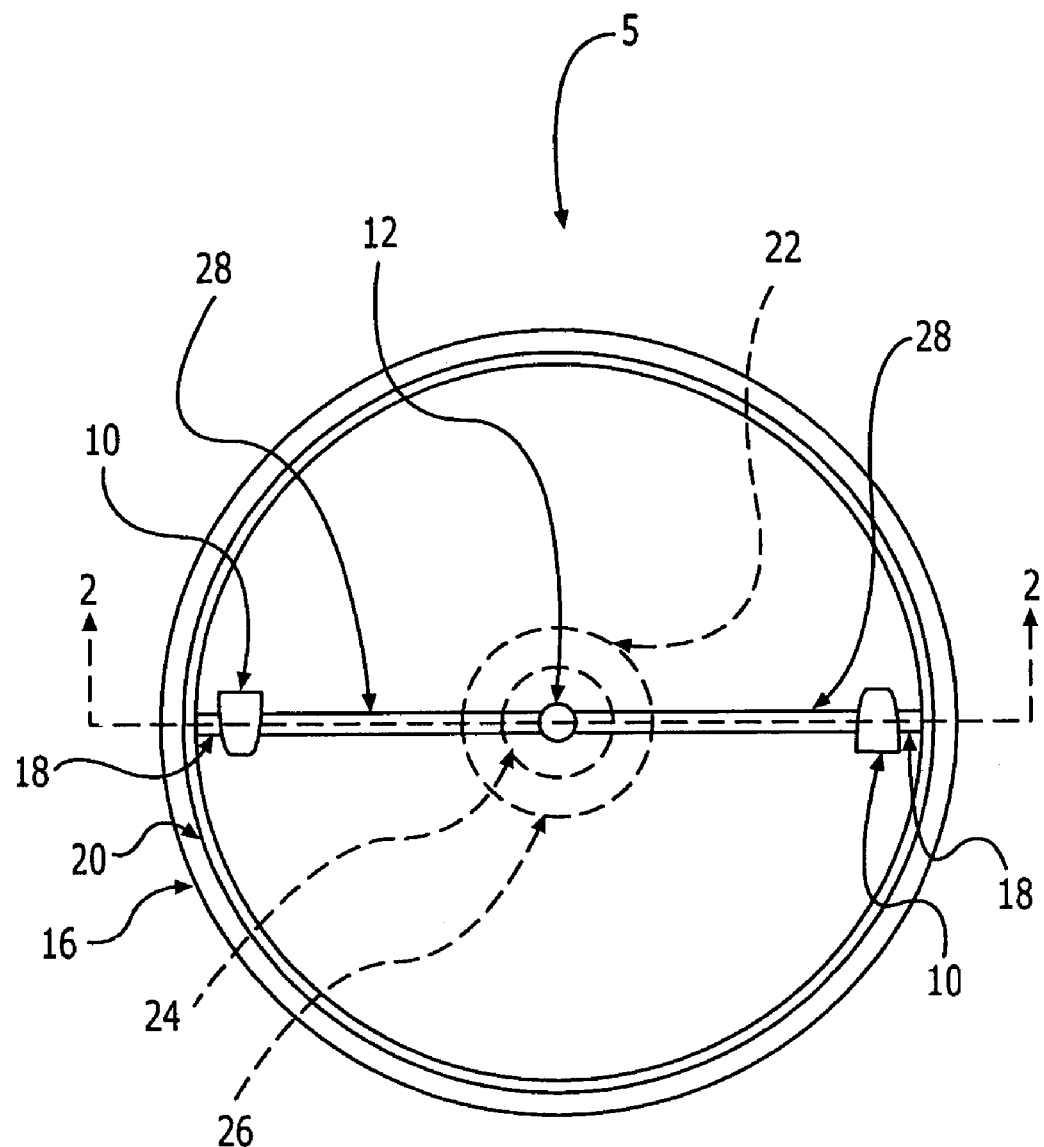
FIG. 1 is a plan view of a preferred embodiment of the present invention.
Figure 2:
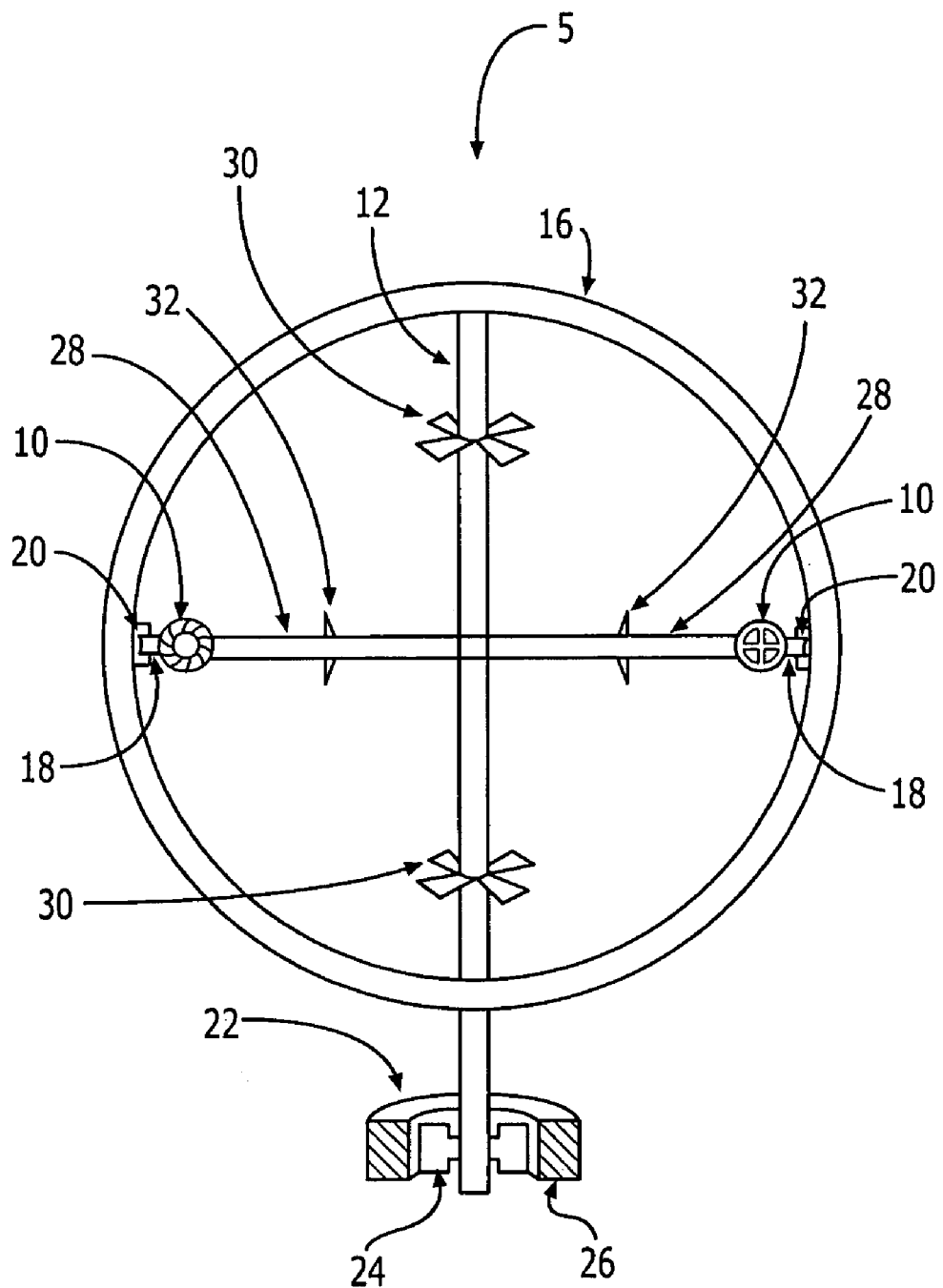
FIG. 2 is an elevational view of the present invention shown in FIG. 1, taken along the line 2—2.

A power generating system 5, in accordance with a preferred embodiment of the present invention as shown in FIGS. 1 and 2, has two nuclear fueled jet turbine engines 10, attaching members 28, a rotatable central shaft 12, an apparatus for converting rotational motion to electricity 22, and a containment structure 16.

Each of the jet turbine engines 10 is attached to one end of each of the connecting members 28. A second end of each of the attaching members 28, opposite the engines 10, is attached to the central shaft at a first position on the central shaft 12 such that the connecting members 28 are aligned and diametrically opposed thereto. The engines 10 and the attaching members 28 are oriented such that thrust generated by the engines 10 is perpendicular to a longitudinal axis of the central shaft 12 thereby causing the central shaft 12 to rotate about the longitudinal axis of the central shaft 12 when the engines 10 are operating. The central shaft 12 and the connecting members 28 may be used as conduits through which operational, control and safety systems and other equipment may be connected to the engines 10.

The conversion apparatus 22 is disposed at a second position on the central shaft 12, thereby communicating the rotational motion of the central shaft 12 to the conversion apparatus 22. In a preferred embodiment, shown in FIGS. 1 and 2, the conversion apparatus 22 is a combination of a rotor 24 and a stationary stator 26, whereby the rotor 24 is affixed to the second position on the central shaft 12 and the stator 26 encloses the rotor 24 such that rotation of the central shaft 12 results in electricity being generated by the rotation of the rotor 24 within the confines of the stator 26.

The containment structure 16 is filled with an operating gas (not shown) which serves as both the propellant for the jet engines 10 and the coolant for the nuclear fuel and other components within the engines 10. The operating gas may be, for example, hydrogen, helium, air, or a mixture thereof. In a preferred embodiment, shown in FIGS. 1 and 2, the containment structure 16 encloses the engines 10, the connecting members 28, and a portion of the central shaft 12. A seal is disposed between the central shaft 12 and the wall of the containment structure 16 where the two components intersect. The seal prevents leakage of the operating gas out of the containment structure 16. The temperature of the operating gas is regulated by a gas refrigeration apparatus (not shown).

Figure 6:
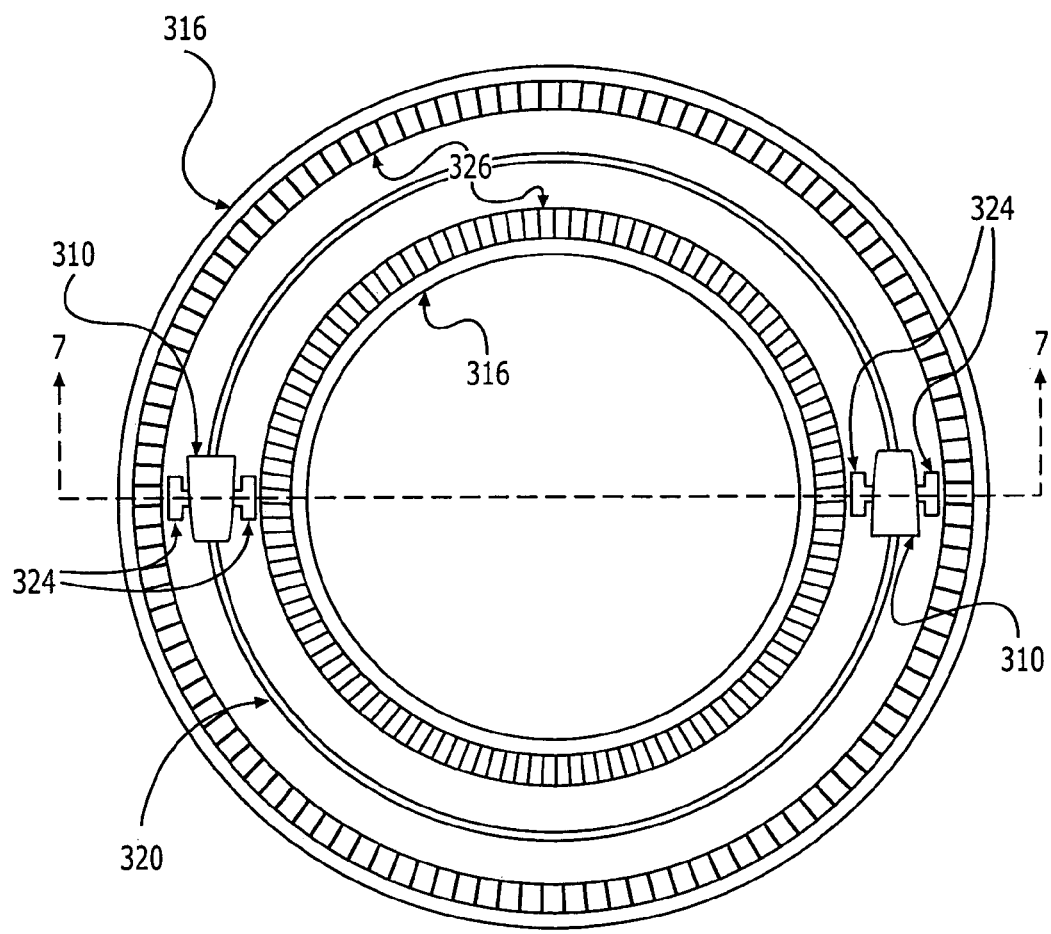
FIG. 6 is a plan view of another alternate embodiment of the invention.
Figure 7:
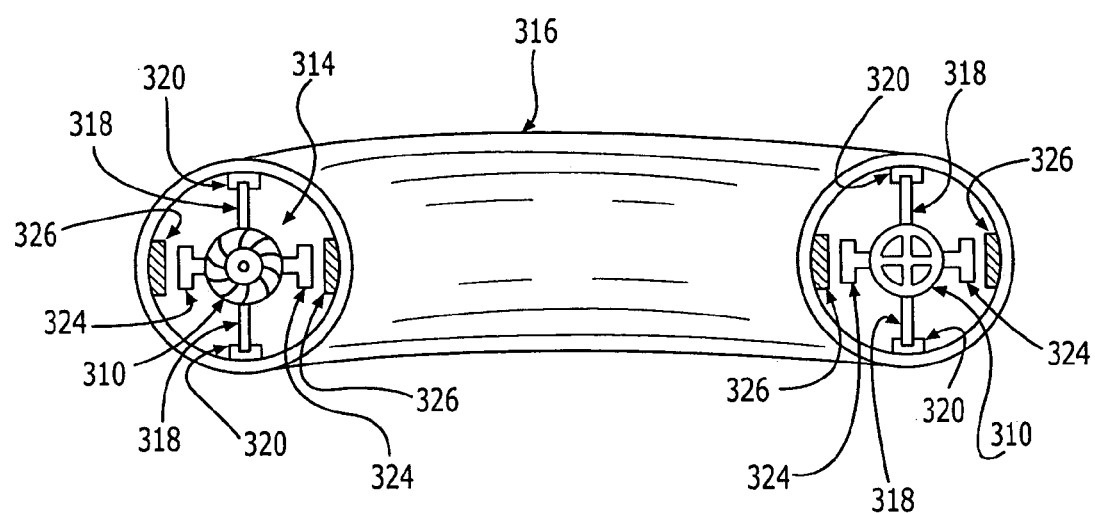
FIG. 7 is an elevational view of the alternate embodiment of FIG. 6, taken along the line 7—7 of FIG. 6.

The containment structure 16 is designed to comply with current nuclear regulatory, safety, and security requirements. The containment structure may have any shape the complies with the above mentioned requirements and that fulfills its purpose with regard to the configuration of equipment therein. For example, the containment structure may be spherical, as shown in FIGS. 1 and 2, a vertical cylindrical as in FIG. 3, a horizontal cylinder as in FIGS. 4 and 5, or a toroidal shape as shown in FIGS. 6 and 7.

Referring to FIGS. 1 and 2, a feature of the present invention may include guide members 18 that are affixable to the exterior of the engines 10 intermediate the engines 10 and the wall of the containment structure 16. A corresponding guide track 20 is affixable to the circumference of the wall of the containment structure 16 in alignment with the guide members 18 and the engines 10. The guide members 18 engage the guide track 20, thereby providing additional support to the engines 10 and may assist in maintaining the engines 10 in a fixed position relative to the longitudinal axis of the central shaft 12 when the engines 10 are operating and producing thrust.

Another feature includes at least one circulation fan 30 attachable to the central shaft 12. The circulation fan 30 facilitates the circulation of the operating gas within the containment structure 16.

A further feature is stabilizers 32 attachable to the connecting members 28 intermediate the engines 10 and the central shaft 12. The stabilizers 32 are aligned parallel to the longitudinal axis of the central shaft to provide additional aerodynamic balancing of the engines 10 during operation. Preferably, the stabilizers are airfoils.

As discussed earlier and shown in FIGS. 1 and 2, the conversion apparatus 22 comprises a rotor 24 affixed to the central shaft 12 and a stationary stator 26 affixed to a base and surrounding the rotor 24. As the central shaft 12 rotates, the affixed rotor 24 rotates within the stationary stator 26, generating electricity which is then transmitted to a distribution system (not shown).

Figure 3:
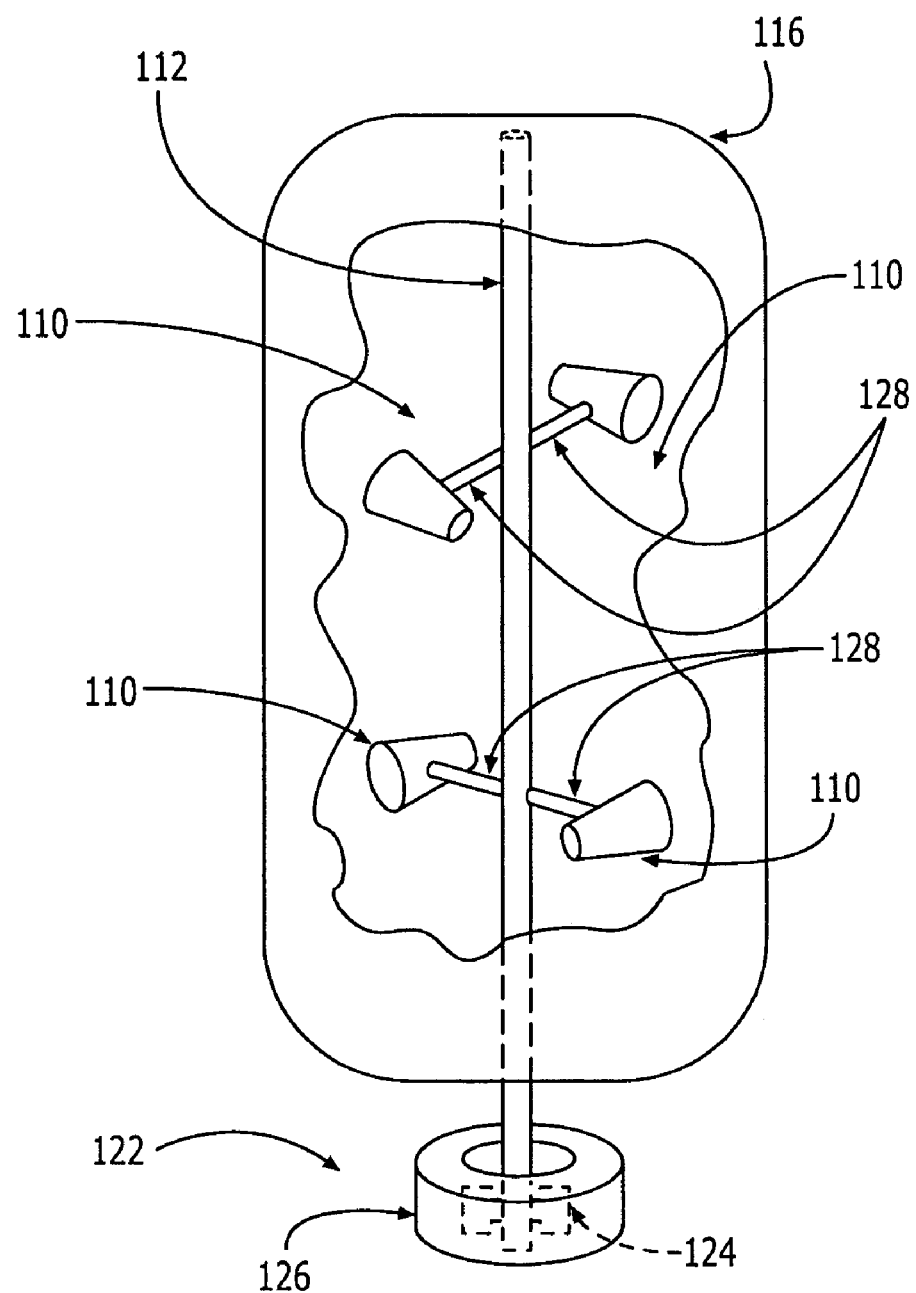
FIG. 3 is a perspective view of the invention showing a different configuration of the containment vessel and the use of additional nuclear-fueled jet engines.

Another preferred embodiment, as shown in FIG. 3, has multiple engines 110, each connected to the central shaft 112 by a corresponding connecting member 128. The engines 110 may be on a single plane or may be spaced longitudinally along the axis of the central shaft 112.

Figure 4:
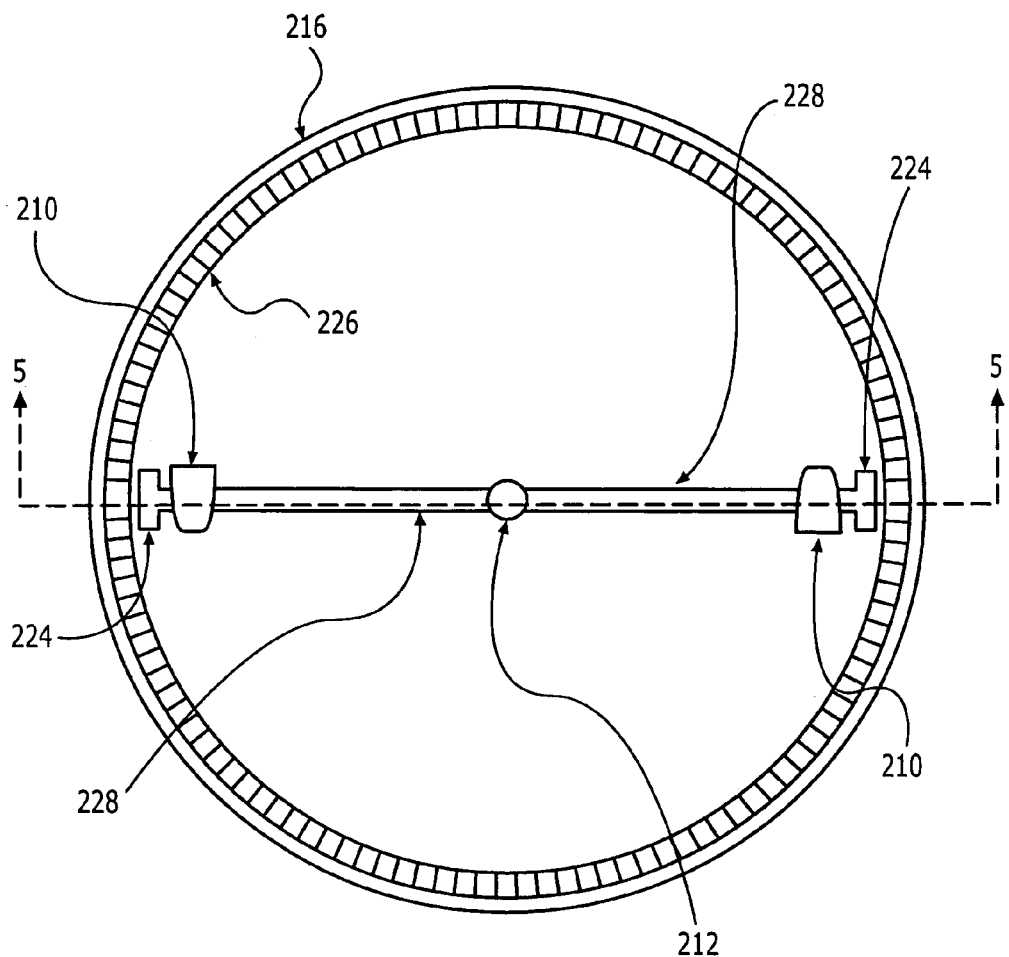
FIG. 4 is a plan view of an alternate embodiment of the invention.
Figure 5:
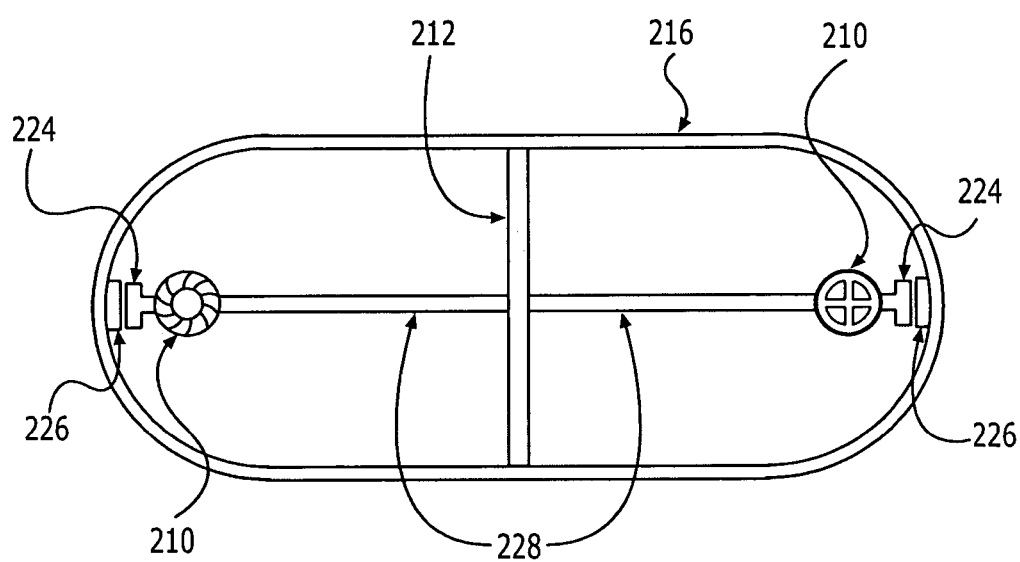
FIG. 5 is an elevational view of the alternate embodiment of FIG. 4, taken along the line 5—5 of FIG. 4.

In a preferred embodiment, shown in FIGS. 4 and 5, a rotor module 224 is affixed to the exterior of each engine 210 between the engines 210 and the wall of the containment structure 216. The rotor modules 224 are oriented toward the wall of the containment structure 216 where a stator belt 226 is affixed to the circumference of the containment structure 216 in alignment with the rotor modules 224. During operation, the engines 210 produce thrust, which causes the engines 210 and the affixed rotor modules 224 to rotate about the central shaft 212. As the engines 210 rotate, the rotor modules 224 rotatably communicate with the stator belt 226, thereby generating electricity.

A further preferred embodiment of the present invention, shown in FIGS. 6 and 7, has the engines 310 enclosed within a toroidal-shaped containment structure 316. The containment structure 316 has an interior surface and an exterior surface. At least one stator belt 326 is affixed to the interior surface of the containment structure 316 at positions diametrically opposed to each other. At least one rotor module 324 is affixed to the exterior of each engine 310 and oriented toward the stator belt 326, such that the rotor module 324 is in a spaced apart juxtaposition with the stator belt 326. If multiple stator belts 326 and rotor modules 324 are used, then the stator belts are preferably spaced evenly about the interior surface of the containment structure 316 and a corresponding rotor module 324 is affixed to the exterior of each engine 310. As the engines 310 travel about the circular track within the containment structure 316, the rotor modules 324 rotate along the stator belts 326 and produce electricity. At least one guide member 318 is affixed to the exterior of each engine 310. The guide member 318 connects each of the engines 310 to a corresponding guide track 320 affixed to an area of the containment structure 316 such that the guide member 318 and track 320 do not interfere with the stator belts 326. The guide member 318 and track 320 maintains the engines 310 in alignment within the containment structure 316. The guide members 318 and track 320 may also be used as a conduit to each engine 310 for the placement of control, operation, and communication equipment (not shown) necessary to operate each engine 310. A feature of this embodiment may include an apparatus for maintaining the proper spacing between engines 310. Another feature of this embodiment may include an apparatus for initiating the operation of the engines 310 and the rotational motion of the apparatus. Additionally, a monorail type unit may be used for the guide member 318 and the track 320.

One feature of the present invention is the engines (collectively identified by reference numeral 10) which may be jet turbine engines similar to conventional internal combustion jet turbine engines. The engines 10 are modified to use nuclear fuel, in particular any suitable fissile material such as uranium, plutonium, thorium, or a mixture thereof, as the primary fuel source. The engines 10 may also use conventional jet fuel as a secondary fuel source. The engines 10 are constructed to withstand the operating temperatures, the use of the operating gas, the forces exerted upon the engines due to the rotational motion experienced by the engines 10 during operation, and the effects of any radiation emitted by the nuclear fuel enclosed within the engines 10.

Figure 8:
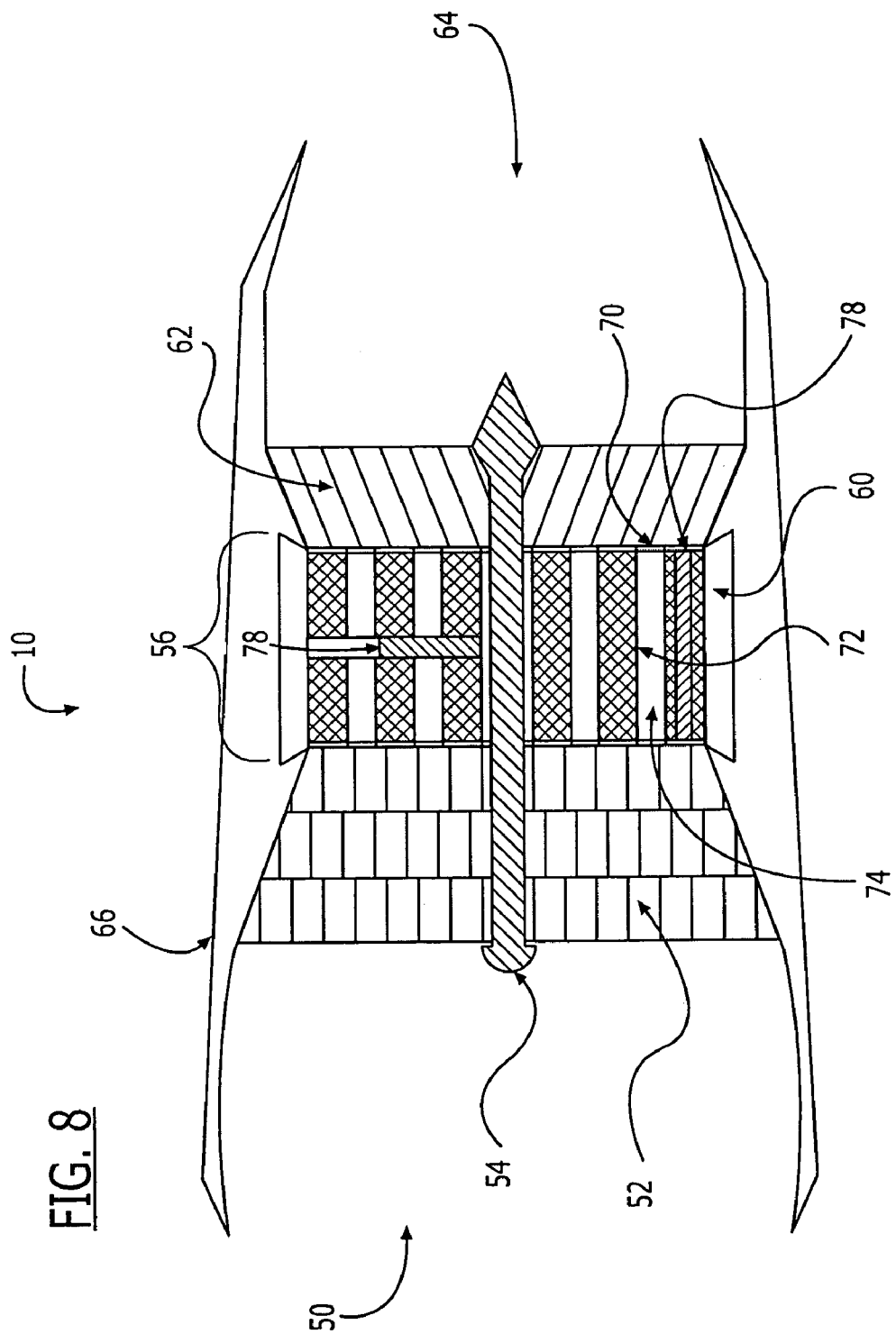
FIG. 8 is a sectional view of a nuclear-fueled gas turbine engine.

Referring to FIG. 8, the jet turbine engine includes an inlet 50, a compressor 52, a burner section 56, a turbine 62, a shaft 54 that connects the compressor 52 and the turbine 62, and an outlet nozzle 64. A shroud 60 comprised of radiation shielding material surrounds the exterior of the burner section 56. An exterior housing 66 encloses the components.

The burner section 56 includes a fuel core 70 comprised of fuel elements 72 containing fissile material assembled in a fuel element lattice (i.e., fuel elements arrayed in a geometric matrix) designed to optimize the operating parameters desired for the power generating apparatus 5. Coolant channels 74, which are part of the fuel element lattice, extend through the fuel core 70. The coolant channels 74 allow the operating gas to flow through the fuel core 70, removing the heat generated by the fuel elements 72 during operation, thus maintaining the fuel core 70 within the desired operating temperature range. Control elements 78 that contain a material that stops the chain reaction of the fissile material by absorbing neutrons (i.e., a "neutron poison") are located within control channels formed within the fuel core 70. The control elements 78 are manipulated so that they, in tandem with the array of the fuel element lattice, regulate the chain reaction within the fuel core 70, thereby consequently regulating the energy produced by the power generation apparatus 5.

During operation, the control elements 78 are manipulated to begin a nuclear fissioning process within the fuel elements 72 in the fuel core 70. Operating gas is drawn into the jet turbine engine through the inlet area 50 and passes through the compressor 52. The compressed operating gas enters the burner section 56 and flows through the coolant channels 74 in the fuel core 70, whereby the heat generated by the fuel elements 72 is transferred to the operating gas. The heated operating gas 44 exits the burner section and flows through the turbine 62, driving the turbine 62 as the operating gas expands. The operating gas then exhausts through the outlet nozzle. The thrust generated by the operating gas exiting the outlet nozzle pushes the jet turbine engine in the opposite direction to that of the exhaust flow. The flow of operating gas through the turbine 62 also drives the compressor 52 which is rotatably connected to the turbine 62 by the rotatable shaft 54.

An alternative configuration of the jet turbine engine is the use of a turbofan engine. A turbofan engine may provide efficiencies greater than those provided by a jet turbine engine. Further, the turbofan engine allows a portion of the operating gas to bypass the fuel core, thereby providing cooling to the exterior of the fuel core in addition to the flow through the coolant channels 74.

Figure 9:
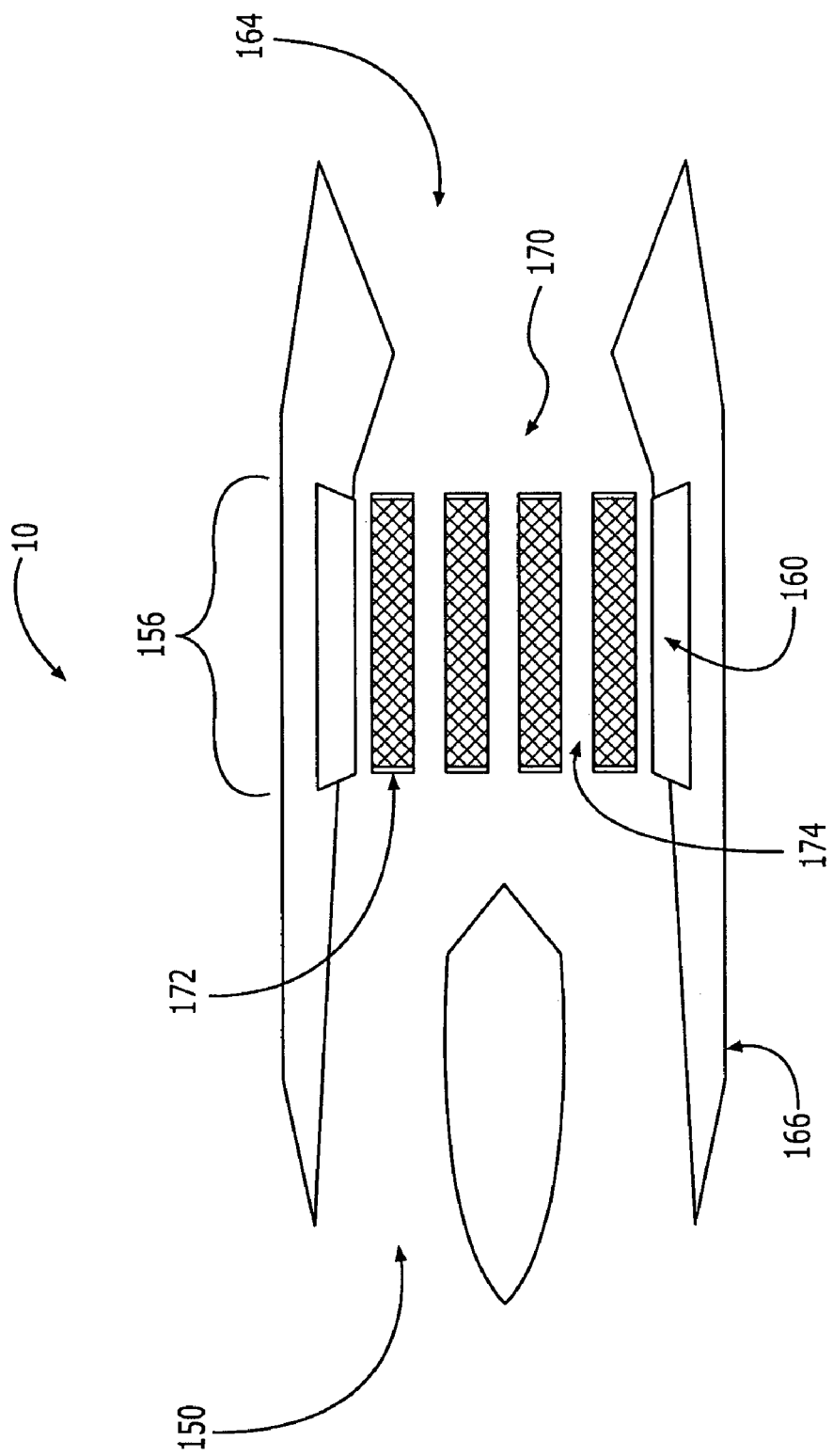
FIG. 9 is a sectional view of a nuclear-fueled ramjet engine.

A nuclear-fueled ramjet engine may be used in the present invention instead of a jet turbine engine. The ramjet engine, shown in FIG. 9, is similar to the current designs of conventional ramjet engines except for the utilization of a nuclear fuel core in the burner (replacing the fuel injector of a conventional ramjet engine). The gas would enter the inlet 150 and be compressed. The gas would then be heated or ignited in the burner 156 from the heat of the nuclear fuel core 170, cooling the nuclear fuel core and providing thrust to the engine as it exited the nozzle 164. The design of the nuclear fuel core for the ramjet engine would be based on principles similar for the nuclear-fueled turbine engine plus the need to reflect the different flow characteristics of a ramjet engine as well as the specific requirements envisioned for the ramjet engine in a particular design. As with the nuclear-fueled turbine engine, some graphite or other shielding 160 around the nuclear fuel core would be considered.

The ramjet engines may be used alone or in a configuration that includes the jet turbine engines. For example, the engines in the present invention should be capable of producing enough thrust to attain a high rotational speed. Thus, the additional efficiencies from using a nuclear-fueled ramjet at high speeds could be obtainable. If used as a supplement to the jet turbine or turbofan engines, the thrust from the ramjet engine would augment the thrust from the turbine engines or be used as the primary thrust for the system at times when it may be desirable to "power down" the nuclear-fueled turbine engines. To protect the conversion apparatus from excessive rotational speed, conventional gear reducing equipment (not shown) may be disposed between the central shaft and the conversion apparatus.

The nuclear-fueled turbine engines and ramjets may be adapted to use a secondary fuel, e.g. jet fuel, to initially facilitate the operation of the engines and the production of threshold rotational motion.

The designs of both a nuclear-fueled turbine engine and a nuclear-fueled ramjet engine should generally be able to incorporate advances currently being made and to be made in the future regarding jet engine design and thermal nuclear propulsion.

The invention is intended to couple the superior qualities of nuclear fuel (its remarkable energy per mass and its long-life) with the efficiencies of jet propulsion to create an electric generating system taking better advantage of the nuclear fuel qualities and providing a simpler design that eliminates some of the significant energy losses from current nuclear reactor designs. These qualities also allow for substantially greater design flexibility as well as the capability to optimize the expected electricity production through the adjustment of various design features, including the type and configurations of the jet engines, the arrangement of nuclear fuel element lattice and other components in the fuel core, the type of the operating gas, the configuration of the containment vessel, and the type and configuration of other related components such as the refrigeration equipment and the apparatus for converting rotational motion to electricity. It is believed that applying current technologies and methodologies through computer modeling and other analyses, substantially enhanced design specifications can be achieved in a cost-effective manner and that these processes can be easily adapted to provide alternative designs for different, specific operational uses intended for this invention.

The structure of the invention also is an inherently safer design than that of many current nuclear reactors because it should have a lower nuclear core power density, would use an inert gas as the coolant and have no heat exchanger. Additionally, the more efficient and simpler design of the invention should result in the use of a smaller quantity of nuclear fuel, and for a longer period of time, thus enhancing its safety features and providing advantages over other nuclear reactor designs as far as nuclear waste disposal. The invention's structure also minimizes the siting or location considerations for nuclear reactors. The invention could be used for general power production (including clustering units together) or for special purposes, such as localized use or meeting peak demands.

This invention would utilize, with adaptions understood by those persons skilled in the art, current state-of-the-art materials and designs for jet engines and thermal nuclear propulsion. This invention also generally permits advances made in jet engine designs and thermal nuclear propulsion to be incorporated either through the designs of future systems or by minor retrofitting of then existing reactors that use this invention.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An apparatus for generating electrical power comprising:
    at least one nuclear-fueled motor for producing thrust having an inlet and an outlet;
    a rotatable shaft having a longitudinal axis, the at least one motor attached to said shaft and oriented such that the thrust produced by the at least one motor is in a perpendicular direction relative to the longitudinal axis of the shaft, resulting in the at least one motor traveling in a radial direction about the longitudinal axis of the shaft;
    a sealed containment structure comprising an operating gas for the at least one nuclear-fueled motor and enclosing the at least one nuclear-fueled motor and at least a portion of the rotatable shaft, said portion being in proximity to the at least one nuclear-fueled motor, wherein the operating gas for the at least one nuclear-fueled motor enters from and is exhausted to a common space within the sealed containment structure; and a means operatively associated with said shaft for converting rotational motion of said shaft to electrical power, wherein the conversion means comprises a rotor and a stator, the rotor comprising at least one rotor module affixed to an exterior of the at least one nuclear-fueled motor intermediate the motor and the containment structure, the stator comprising a stationary stator belt affixed to the containment structure in engagable proximity to the rotor.

2. The apparatus according to claim 1, further comprising at least one connecting member corresponding to the at least one nuclear-fueled motor, the connecting member extending between the shaft and the motor for connecting the motor thereto.

3. The apparatus according to claim 1, wherein the at least one nuclear-fueled motor contains a burner section having a fuel core of fissile material therein.

4. The apparatus according to claim 3, wherein the at least one nuclear-fueled motor is a jet turbine engine, a jet turbofan engine, a ramjet engine or a combination thereof.

5. The apparatus according to claim 1, wherein the sealed containment structure is cylindrical.

6. The apparatus according to claim 1, wherein the sealed containment structure is toroidal.

7. The apparatus according to claim 1, further comprising a guidance system for supporting the at least one nuclear-fueled motor relative to the longitudinal axis of the shaft during operation, the guidance system comprising a guide member affixable to the at least one nuclear-fueled motor intermediate the motor and the containment structure and a guide track affixable to the containment structure opposite the guide member, the guide member being in movable contact with the guide track.

8. The apparatus according to claim 1, wherein the operating gas is employed by the at least one motor as coolant and propellant.

9. An apparatus for generating electrical power comprising:

at least one nuclear-fueled motor for producing thrust having an inlet and an outlet;

a sealed containment structure having a toroidal shape formed with an interior surface and an external surface, said sealed containment structure comprising an operating gas and the at least one nuclear-fueled motor; and at least one means for converting rotational motion to electrical power, said means having a first part and a second part, the first part being attached to said at least one nuclear-fueled motor intermediate the at least one nuclear-fueled motor and the interior surface of the containment structure, and the second part being affixed to the interior surface of the containment structure in alignment with said first part of said at least one means such that the first part of said at least one means is in a spaced apart juxtaposition with the second part of said at least one means.

10. The apparatus according to claim 9, wherein the said at least one means includes a first means and a second means;

the first means having a first part affixed to the at least one nuclear-fueled motor and a second part affixed to the interior surface of the containment structure, the first part of said first means being oriented toward and in a spaced apart juxtaposition with said second part of the first means;

the second means having a first part affixed to the at least one nuclear-fueled motor and a second part affixed to the interior surface of the containment structure, the first part of said second means being oriented toward and in a spaced apart juxtaposition with the second part of said second means; and wherein said first means is opposite said second means relative to said at least one nuclear-fueled motor.

11. The apparatus according to claim 9, wherein the at least one nuclear-fueled motor contains a burner section having a fuel core of fissile material therein.

12. The apparatus according to claim 9, wherein the at least one nuclear-fueled motor is a jet turbine engine, a jet turbofan engine, a ramjet engine or a combination thereof.

13. The apparatus according to claim 9, wherein the operating gas is employed by the at least one motor as coolant and propellant.

14. The apparatus according to claim 10, wherein the first part is a rotor module.

15. The apparatus according to claim 10, wherein the second part is a stator belt.

16. The apparatus according to claim 9, further comprising a guidance system for supporting the at least one nuclear-fueled motor, the guidance system comprising a guide member affixable to the at least one nuclear-fueled motor and a guide track affixable to the containment structure.

17. An apparatus for generating electrical power comprising:

at least one nuclear-fueled motor for producing thrust having an inlet and an outlet;

a means for guiding the at least one nuclear-fueled motor in rotational motion;

a sealed containment structure comprising an operating gas for the at least one nuclear-fueled motor and enclosing the at least one nuclear-fueled motor and at least a portion of the guiding means, said portion being in proximity to the at least one nuclear-fueled motor, wherein the operating gas for the at least one nuclear-fueled motor enters from and is exhausted to a common space within the sealed containment structure; and a means operatively associated with the guiding means for converting rotational motion of the guiding means to electrical power, wherein the conversion means comprises a rotor and a stator, the rotor comprising at least one rotor module affixed to an exterior of the at least one nuclear-fueled motor intermediate the motor and the containment structure, the stator comprising a stationary stator belt affixed to the containment structure in engageable proximity to the rotor.

* * * * *